United States Patent
Goodman et al.

(10) Patent No.: US 8,694,777 B2
(45) Date of Patent: Apr. 8, 2014

(54) SECURELY IDENTIFYING HOST SYSTEMS

(75) Inventors: Brian D. Goodman, Brooklyn, NY (US); Lisa Seacat DeLuca, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 12/856,045

(22) Filed: Aug. 13, 2010

(65) Prior Publication Data
US 2012/0042163 A1 Feb. 16, 2012

(51) Int. Cl.
H04L 29/06 (2006.01)

(52) U.S. Cl.
USPC .......................................... 713/168

(58) Field of Classification Search
USPC .......................................... 713/168
See application file for complete search history.

(56) References Cited

U.S. PATENT DOCUMENTS

| | | | |
|---|---|---|---|
| 5,007,082 A | 4/1991 | Cummins | |
| 6,584,564 B2 | 6/2003 | Olkin et al. | |
| 6,940,864 B2 * | 9/2005 | Abdelilah et al. | 370/412 |
| 6,986,061 B1 | 1/2006 | Kunzinger | |
| 7,509,406 B2 | 3/2009 | Abdo et al. | |
| 7,788,663 B2 * | 8/2010 | Illowsky et al. | 717/177 |
| 8,015,563 B2 * | 9/2011 | Araujo et al. | 718/1 |
| 2002/0157010 A1 * | 10/2002 | Dayan et al. | 713/191 |
| 2003/0012209 A1 * | 1/2003 | Abdelilah et al. | 370/412 |
| 2003/0084286 A1 * | 5/2003 | Bader et al. | 713/165 |
| 2003/0088429 A1 | 5/2003 | Schmeling et al. | |
| 2003/0188180 A1 * | 10/2003 | Overney | 713/193 |
| 2006/0026305 A1 * | 2/2006 | Illowsky et al. | 710/8 |
| 2006/0174018 A1 * | 8/2006 | Zhu et al. | 709/229 |
| 2007/0196074 A1 * | 8/2007 | Jennings et al. | 386/46 |
| 2007/0234040 A1 * | 10/2007 | Hurst et al. | 713/156 |
| 2007/0234302 A1 * | 10/2007 | Suzuki et al. | 717/126 |
| 2008/0080718 A1 | 4/2008 | Meijer et al. | |
| 2008/0083036 A1 | 4/2008 | Ozzie et al. | |
| 2008/0098212 A1 * | 4/2008 | Helms et al. | 713/155 |
| 2008/0104699 A1 | 5/2008 | Gounares et al. | |
| 2008/0226081 A1 * | 9/2008 | Terao | 380/277 |

(Continued)

OTHER PUBLICATIONS

Garfinkel, T. et al.; "Terra: a virtual machine-based platform for trusted computing"; Proceeding SOSP '03 Proceedings of the nineteenth ACM symposium on Operating systems principles; pp. 193-206; ACM New York, NY, USA Oct. 19-22, 2003.*

(Continued)

Primary Examiner — Michael S McNally
(74) Attorney, Agent, or Firm — William E. Schiesser; Maxine L. Barasch; Keohane & D'Alessandro PLLC (57) ABSTRACT

Embodiments of the present invention allow for "end-user" provisioned instances to securely identify themselves beyond a simple user ID and password. Specifically, embodiments of the present invention use a multi-part security approach that includes (among other things): an identifying key (e.g., a shared private key) known by the cloud security system and the instance; and at least one additional security factor such as an identifier found in TCP/IP packets (e.g., an internet protocol address). In a typical embodiment, a request for an instance (e.g., a virtual machine) is received, and a template (e.g., an image) corresponding to the requested instance is identified. From this template, the instance is provisioned. Under the embodiments of the present invention, the instance will be provisioned to include a security key. When a request is thereafter received from the instance, the request is validated using the security key and the additional security factor(s).

22 Claims, 6 Drawing Sheets

(56) References Cited

U.S. PATENT DOCUMENTS

| | | | |
|---|---|---|---|
| 2008/0229089 A1* | 9/2008 | Assouad et al. | 713/2 |
| 2008/0235175 A1 | 9/2008 | Olive | |
| 2008/0256534 A1* | 10/2008 | Chess et al. | 718/1 |
| 2009/0228950 A1 | 9/2009 | Reed et al. | |
| 2009/0249492 A1* | 10/2009 | Boesgaard Sorensen | 726/27 |
| 2009/0328145 A1* | 12/2009 | Berger et al. | 726/3 |
| 2010/0082991 A1* | 4/2010 | Baldwin et al. | 713/176 |
| 2010/0088236 A1 | 4/2010 | Karabulut et al. | |
| 2010/0131948 A1* | 5/2010 | Ferris | 718/1 |
| 2010/0131949 A1 | 5/2010 | Ferris | |
| 2010/0153749 A1* | 6/2010 | Sakai | 713/193 |
| 2010/0199104 A1* | 8/2010 | Van Rijnswou | 713/189 |
| 2010/0287363 A1* | 11/2010 | Thorsen | 713/2 |
| 2010/0325427 A1* | 12/2010 | Ekberg et al. | 713/156 |
| 2011/0016467 A1* | 1/2011 | Kane | 718/1 |
| 2011/0093847 A1* | 4/2011 | Shah | 718/1 |
| 2011/0126275 A1* | 5/2011 | Anderson et al. | 726/8 |
| 2011/0197065 A1* | 8/2011 | Stauth et al. | 713/170 |
| 2011/0209064 A1* | 8/2011 | Jorgensen et al. | 715/733 |
| 2011/0225342 A1* | 9/2011 | Sharma et al. | 711/6 |
| 2011/0246778 A1* | 10/2011 | Duane | 713/176 |
| 2011/0258441 A1* | 10/2011 | Ashok et al. | 713/168 |
| 2011/0302400 A1* | 12/2011 | Maino et al. | 713/2 |
| 2012/0137117 A1* | 5/2012 | Bosch et al. | 713/2 |

OTHER PUBLICATIONS

Amazon Web Services, "Overview of Security Processes" Amazon Web Services, Nov. 2009, http://aws.amazon.com/security.

James Huges, "Encrypted Storage and Key Management for the Cloud" Jul. 23, 2009, www.cryptoclarity.com/CryptoClarityLLC/Welcome/Entries/2009/7/23.

J.D. Meier et al. "How to :Use Forms Authentication with SQL server in ASP.Net 1.1" Jan. 2002, http://msdn.microsoft.com/practices/default.aspx.

Mell et al., "The NIST Definition of Cloud Computing", National Institute of Standards and Technology, Information Technology Laboratory, Version 15, Oct. 7, 2009, 2 pages.

\* cited by examiner

SECURELY IDENTIFYING HOST SYSTEMS

TECHNICAL FIELD

The present invention generally relates to system security. Specifically, the present invention relates to securely identifying host systems such as virtual machines (e.g., in a cloud computing environment).

BACKGROUND

The cloud computing environment is an enhancement to the predecessor grid environment, whereby multiple grids and other computation resources may be further abstracted by a cloud layer, thus making disparate devices appear to an end-user as a single pool of seamless resources. These resources may include such things as physical or logical compute engines, servers and devices, device memory, storage devices.

Cloud computing environments create virtual machines, also called instances, on behalf of users (people or machines). These virtual machines are often delivered with "root" level access allowing users to manage them as they see fit. To enable instances to act autonomically, the instance needs to be able to call management APIs to create additional resources, change their current resources, etc. One challenge is being able to do this securely without compromising credentials or presuming a specific implementation. Previous attempts have failed to accomplished this.

SUMMARY

Embodiments of the present invention allow for "end-user" provisioned instances to securely identify themselves beyond a simple user ID and password. Specifically, embodiments of the present invention use a multi-part security approach that includes (among other things): an identifying key (e.g., a shared private key) known by a cloud security system and the instance; and at least one additional security factor such as an identifier found in TCP/IP packets (e.g., an internet protocol (IP) address). In a typical embodiment, a request for an instance (e.g., a virtual machine) is received, and a template (e.g., an image) corresponding to the requested instance is identified. From this template, the instance is provisioned. Under the embodiments of the present invention, the instance will be provisioned to include a security key. When a request is thereafter received from the instance, the request is validated using the security key and the additional security factor(s).

A first aspect of the present invention provides a method for securely identifying host systems, comprising: receiving a request for an instance; identifying a template corresponding to the request; and provisioning the instance from the template, the instance being provisioned to include a security key.

A second aspect of the present invention provides a system for securely identifying host systems, comprising: a bus; a processor coupled to the bus; and a memory medium coupled to the bus, the memory medium comprising instructions to: receive a request for an instance; identify a template corresponding to the request; provision the instance from the template, the instance being provisioned to include a security key; receive a request from the instance; and validate the request from the instance using the security key and at least one additional security validation factor.

A third aspect of the present invention provides a computer program product for securely identifying host systems, the computer program product comprising: a computer readable storage media, and program instructions stored on the computer readable storage media, to: receive a request for an instance; identify a template corresponding to the request; and provision the instance from the template, the instance being provisioned to include a security key;

A fourth aspect of the present invention provides a method for deploying a system for securely identifying host systems, comprising: providing a computer infrastructure being operable to: receive a request for an instance; identify a template corresponding to the request; and provision the instance from the template, the instance being provisioned to include a security key.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Embodiments of the present invention allow for "end-user" provisioned instances to securely identify themselves beyond a simple user ID and password. Specifically, embodiments of the present invention use a multi-part security approach that includes (among other things): an identifying key (e.g., a shared private key) known by the cloud security system and the instance; and at least one additional security factor such as an identifier found in TCP/IP packets (e.g., an internet protocol address). In a typical embodiment, a request for an instance (e.g., a virtual machine) is received, and a template (e.g., an image) corresponding to the requested instance is identified. From this template, the instance is provisioned. Under the embodiments of the present invention, the instance will be provisioned to include a security key. When a request is thereafter received from the instance, the request is validated using the security key and the additional security factor(s).

The combination of multiple security factors enables unique identification of the instance. Moreover, the generation of the key can be as complex and secure as deemed necessary (e.g., to the point that the key is not "available" in the typical manner) to make compromising security extremely challenging. This capability could be delivered as a service external to a cloud. It could also leverage a private node model such as an application web service (AWS) where the service is delivered locally to the guests to make it more complex.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
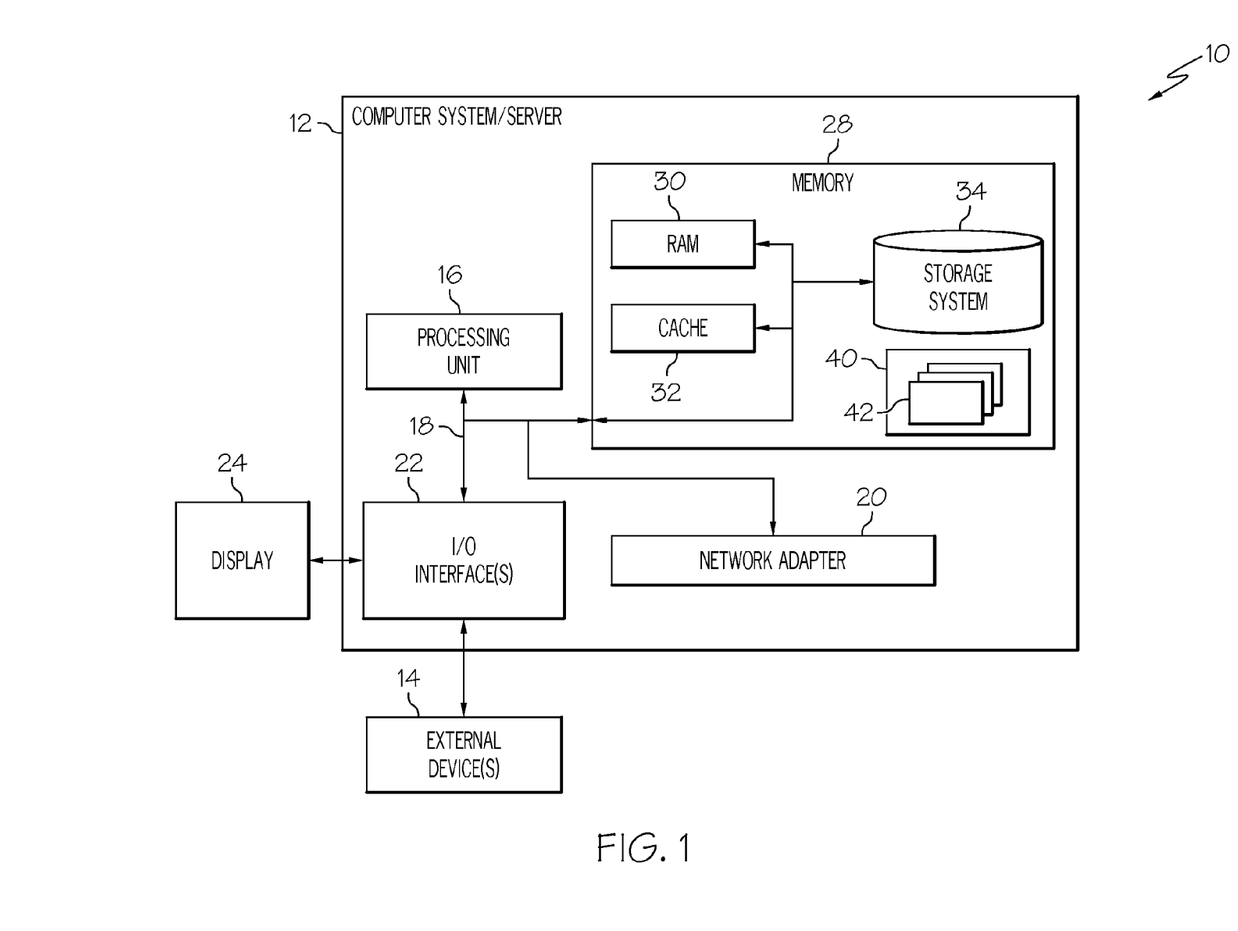
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
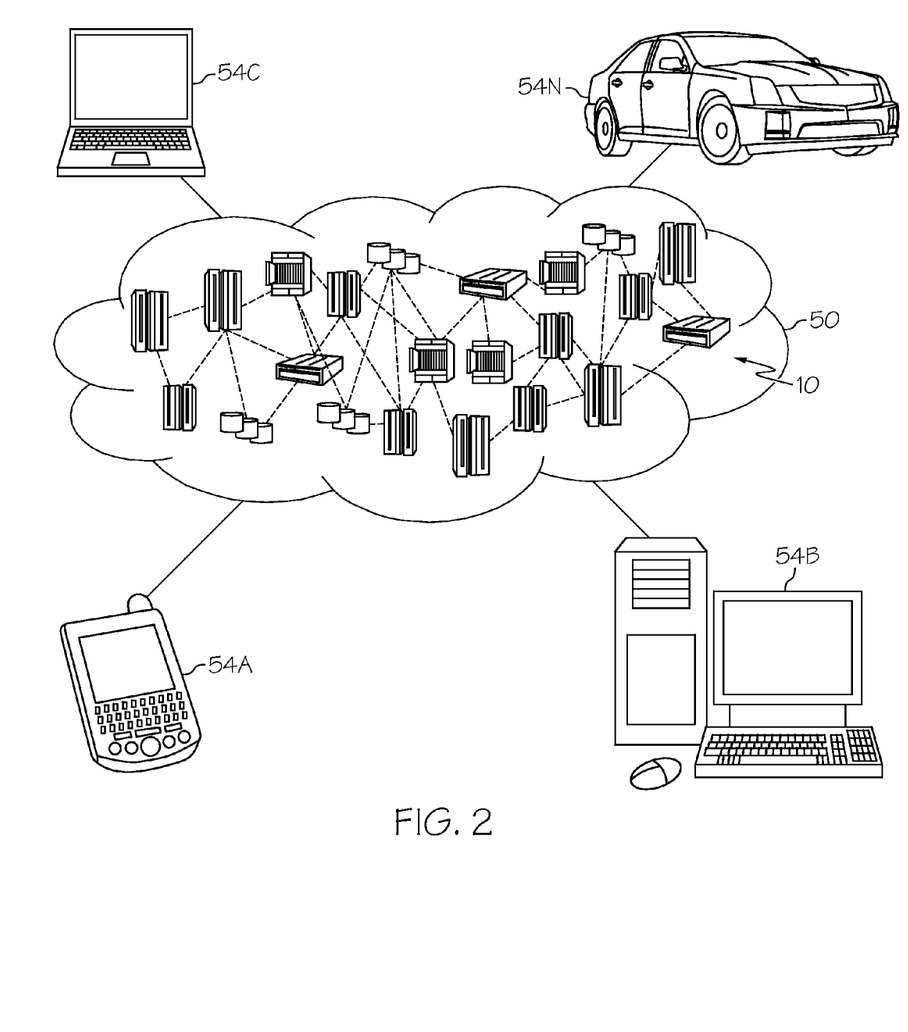
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
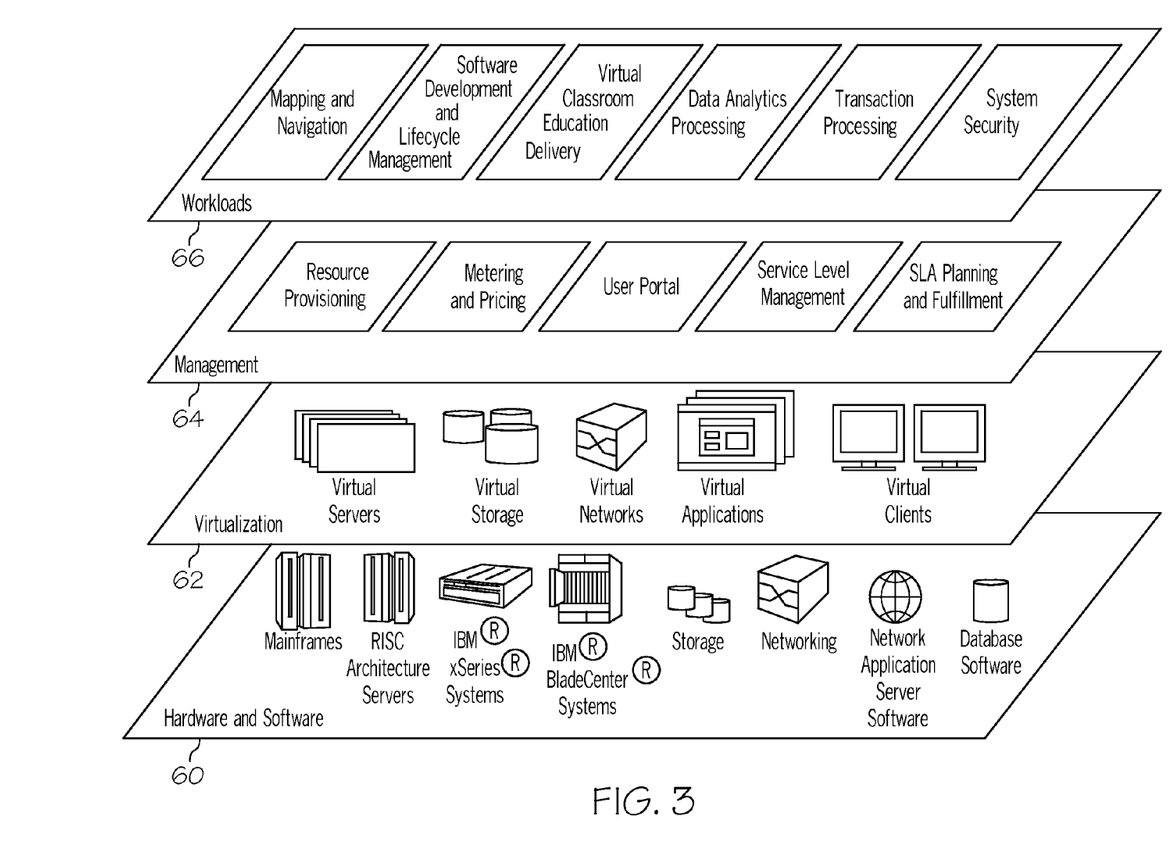
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software. In one example, IBM WebSphere® application server software and database software. In one example, IBM DB2® database software. (IBM, zSeries, pSeries, xSeries, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and system security. As mentioned above, all of the foregoing examples described with respect to FIG. 3 are illustrative only, and the invention is not limited to these examples.

It is understood that all functions of the present invention as described herein are typically performed by the system security function, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of clustered computing environment now known or later developed.

Figure 4:
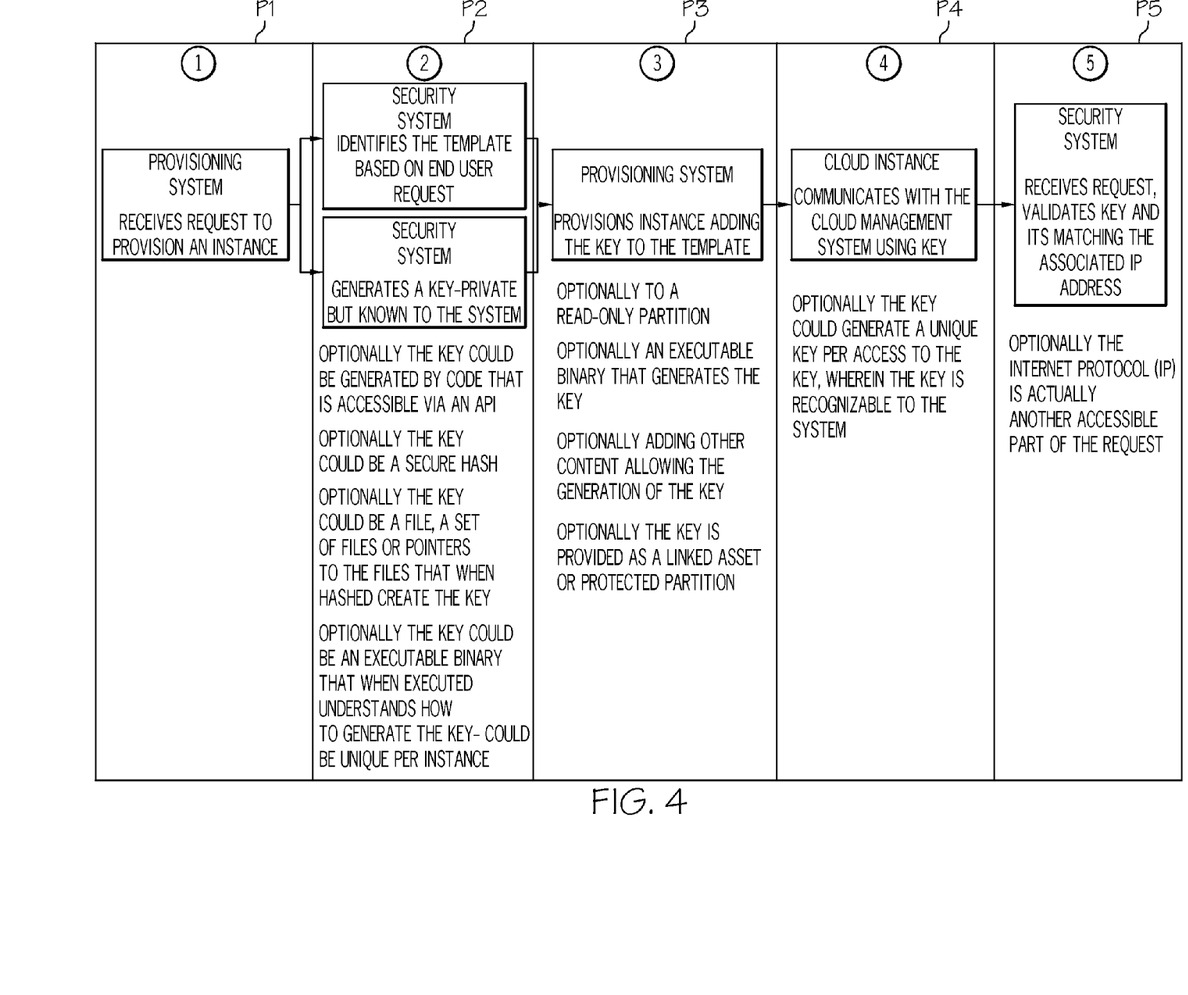
FIG. 4 depicts a process flow diagram according to an embodiment of the present invention.
Figure 5:
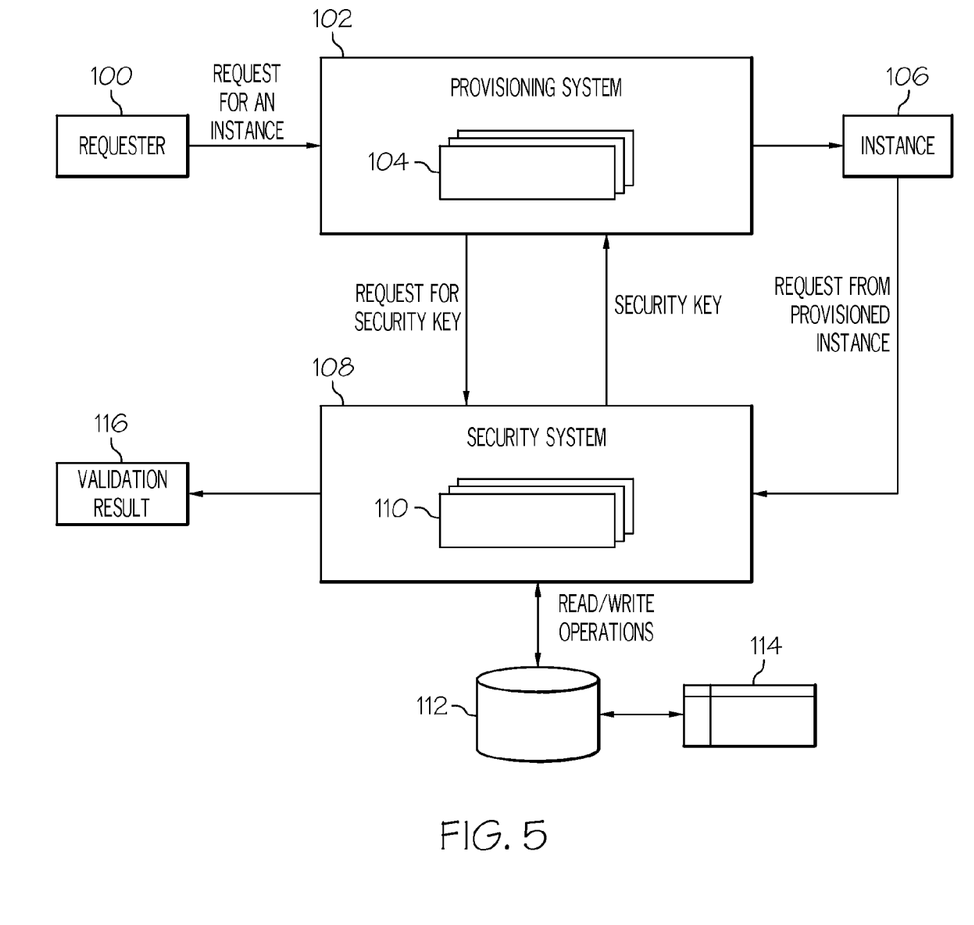
FIG. 5 depicts the cloud security system as validating incoming requests according to an embodiment of the present invention.

Referring now to FIGS. 4 and 5 collectively, the embodiments of the present invention will be discussed in greater detail. Specifically, FIG. 4 depicts a flow diagram of the functions recited herein (e.g., depicted in steps P1-5, while FIG. 5 depicts an architectural diagram showing the components that perform the functions of FIG. 4. It is understood in advance that while FIG. 5 shows two separate systems, namely, provisioning system 102 and security system 108 that work in conjunction with one another, these systems could be realized within a single system (e.g., program 40 having modules 42 of FIG. 1). They are shown as two separate systems in FIG. 5 for illustrative purposes only.

Regardless, in step P1, a provisioning system 102 having one or more program modules 104 (which perform the underlying functions thereof) receives a request to provision an instance (e.g., a virtual machine) from a requester 100, which could be a user, a group of users, a machine or third party service working on behalf of either. In step P2, provisioning system 102 identifies a template (e.g., an image) from which the instance can be generated, and performs any other steps related to preparing to provision. The template can be accessed from any type of resource such as an image library, etc. Moreover, this step could also include the accessing of a user profile (e.g., corporate profile, social networking profile, etc.). This information can provide information on the requester (e.g., demographics, position, access level, previous requests, etc.). Using this information, a template may be more readily identified. Regardless, provisioning system 102 request a security key from security system 108 (which also includes one or more program modules 110 that perform the underlying functions thereof) will a unique key can be generated that is private but known to the system. Upon receiving the request, security system 108 will generate a security key.

Several options are possible when generating the security key. For example, the key could be generated from and/or using: a globally unique string; a secure hash; an application programming interface (API) to yield the security key; a hashed set of files; pointers to a hashed set of files and/or an executed binary. It is understood that the security key could be generated externally to the system or by the system itself. Once the security key is generated, it will be stored in a table 114 in a database 112 or the like. In a typical embodiment, the table 114 associates instances with their corresponding security keys. The security key will then be returned to provisioning system 102. In step P3, provisioning system 102 will provision instance 106 while inserting the security key into instance 106. As stated above, there are multiple options for handling the security key. For example, the key could be inserted into a read-only partition. Alternatively, executable binary code that is configured to generate the key could be inserted. Still yet, other content allowing the generation of the key could be inserted. Moreover, the key could be provided as a linked asset or protected partition.

Regardless, in step P4, instance 106 is now able to make calls/requests to the system using this key. In one embodiment, a unique key could be generated (using any of the approaches discussed above) for each access to the key. In such an embodiment, the security key is typically understood by the system. In any event, in step P5, security system 108 receives and validates a request from instance 106. Based on the security key embedded within instance 106 and at least one additional security factor, security system 108 will attempt to validate the request. The additional security factor(s) can comprise any other method of validation now known or later developed. For example, the additional security factor can comprise at least one of the following: an internet protocol (IP) address associated with the instance, header information associated with the request received from the instance, etc. If the request is validated, it will be fulfilled by the system. To validate the security key, security system 108 will access the entry in table 114 corresponding instance 106 that was previously created when the security key was generated. As mentioned, this entry typically correlates instance 106 with its security key and, optionally, the additional security factor. A validation result 116 can then be provided.

Figure 6A:
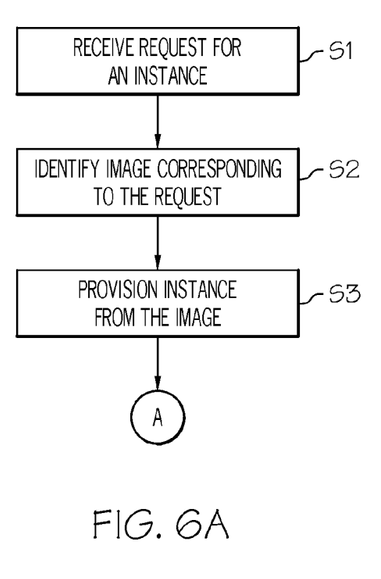
FIGS. 6A-B depicts a method flow diagram according to an embodiment of the present invention.
Figure 6B:
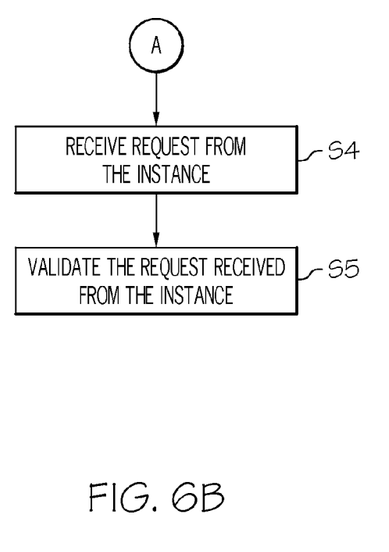

Referring now to FIG. 6A-B, a method flow diagram is shown. In step S1 of FIG. 6A, a request for an instance such as a virtual machine is received. In step S2, a template such as an image corresponding to the request is identified. In step S3, the instance is provisioned from the template, the instance being provisioned to include a security key. As mentioned above, the security key can be yielded in any type of fashion. For example, the key can be yielded from a globally unique string, a secure hash, an application programming interface (API), a hashed set of files, and/or an executed binary to yield the security key. At this point, the process flows to step S4 of FIG. 6A in which a request is received from the instance. In step S5, the request is validated from the instance using the security key and at least one additional security validation factor such as an IP address.

While shown and described herein as a system security solution, it is understood that the invention further provides various alternative embodiments. For example, in one embodiment, the invention provides a computer-readable/useable medium that includes computer program code to enable a computer infrastructure to provide system security functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide system security functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for system security. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for securely identifying host systems, comprising:
receiving, using at least one computing device, a request for an instance;
identifying, using the at least one computing device, a template corresponding to the request;
provisioning, using the at least one computing device, the instance from the template, the instance being provisioned to include a security key within a read-only partition for validating a request from the instance;
receiving, using the at least one computing device, the request from the instance; and
validating, using the at least one computing device, the request from the instance using the security key and at least one additional security validation factor.

2. The method of claim 1, the additional security factor comprising at least one of the following: an internet protocol (IP) address associated with the instance, or header information associated with the request received from the instance.

3. The method of claim 1, further comprising generating, using the at least one computing device, a globally unique string to yield the security key.

4. The method of claim 1, further comprising generating, using the at least one computing device, a secure hash to yield the security key.

5. The method of claim 1, further comprising accessing, using the at least one computing device, an application programming interface (API) to yield the security key.

6. The method of claim 1, further comprising hashing, using the at least one computing device, a set of files to yield the security key.

7. The method of claim 1, further comprising executing, using the at least one computing device, a binary to yield the security key.

8. The method of claim 1, the template comprising an image, the instance comprising a virtual machine, and, the instance being provisioned within a cloud computing environment.

9. A system for securely identifying host systems, comprising:
a bus;
a processor coupled to the bus; and
a memory medium coupled to the bus, the memory medium comprising instructions to:

receive a request for an instance;
identify a template corresponding to the request; and
provision the instance from the template, the instance being provisioned to include a security key for validating a request from the instance, the key comprising executable binary code.

10. The system of claim 9, the memory medium further comprising instructions to:
receive the request from the instance; and
validate the request from the instance using the security key and at least one additional security validation factor.

11. The system of claim 10, the additional security factor comprising at least one of the following: an internet protocol (IP) address associated with the instance, or header information associated with the request received from the instance.

12. The system of claim 9, the template comprising an image, the instance comprising a virtual machine, and the instance being provisioned within a cloud computing environment.

13. The system of claim 9, the memory medium further comprising instructions to generate the security key.

14. The system of claim 9, the security key being generated from at least one of the following: a globally unique string, a secure hash, an application programming interface (API) to yield the security key; a hashed set of files; or a set of pointers to the set of hashed files.

15. A computer program product for securely identifying host systems, the computer program product comprising a non-transitory computer readable storage medium, and program instructions stored on the non-transitory computer readable storage medium, to:
receive a request for an instance;
identify a template corresponding to the request; and
provision the instance from the template, the instance being provisioned to include a security key for validating a request from the instance, the key comprising a linked asset.

16. The computer program product of claim 15, further comprising program instructions stored on the non-transitory computer readable storage medium to:
receive the request from the instance; and
validate the request from the instance using the security key and at least one additional security validation factor.

17. The computer program product of claim 16, the additional security factor comprising at least one of the following: an internet protocol (IP) address associated with the instance, or header information associated with the request received from the instance.

18. The computer program product of claim 15, the template comprising an image, the instance comprising a virtual machine, and the instance being provisioned within a cloud computing environment.

19. The computer program product of claim 15, further comprising program instructions stored on the non-transitory computer readable storage medium to generate the security key.

20. The computer program product of claim 15, the security key being generated from at least one of the following: a globally unique string, a secure hash, an application programming interface (API) to yield the security key; a hashed set of files; or a set of pointers to the set of hashed files.

21. A method for deploying a system for securely identifying host systems, comprising:
providing a computer infrastructure being operable to:
receive a request for an instance;
identify a template corresponding to the request;
provision the instance from the template, the instance being provisioned to include a security key for validating a request from the instance, the key comprising a protected partition;
receive the request from the instance; and
validate the request from the instance using the security key and at least one additional security validation factor.

22. The method of claim 21, the additional security factor comprising at least one of the following: an internet protocol (IP) address associated with the instance, or header information associated with the request received from the instance.

* * * * *